Figure 1:
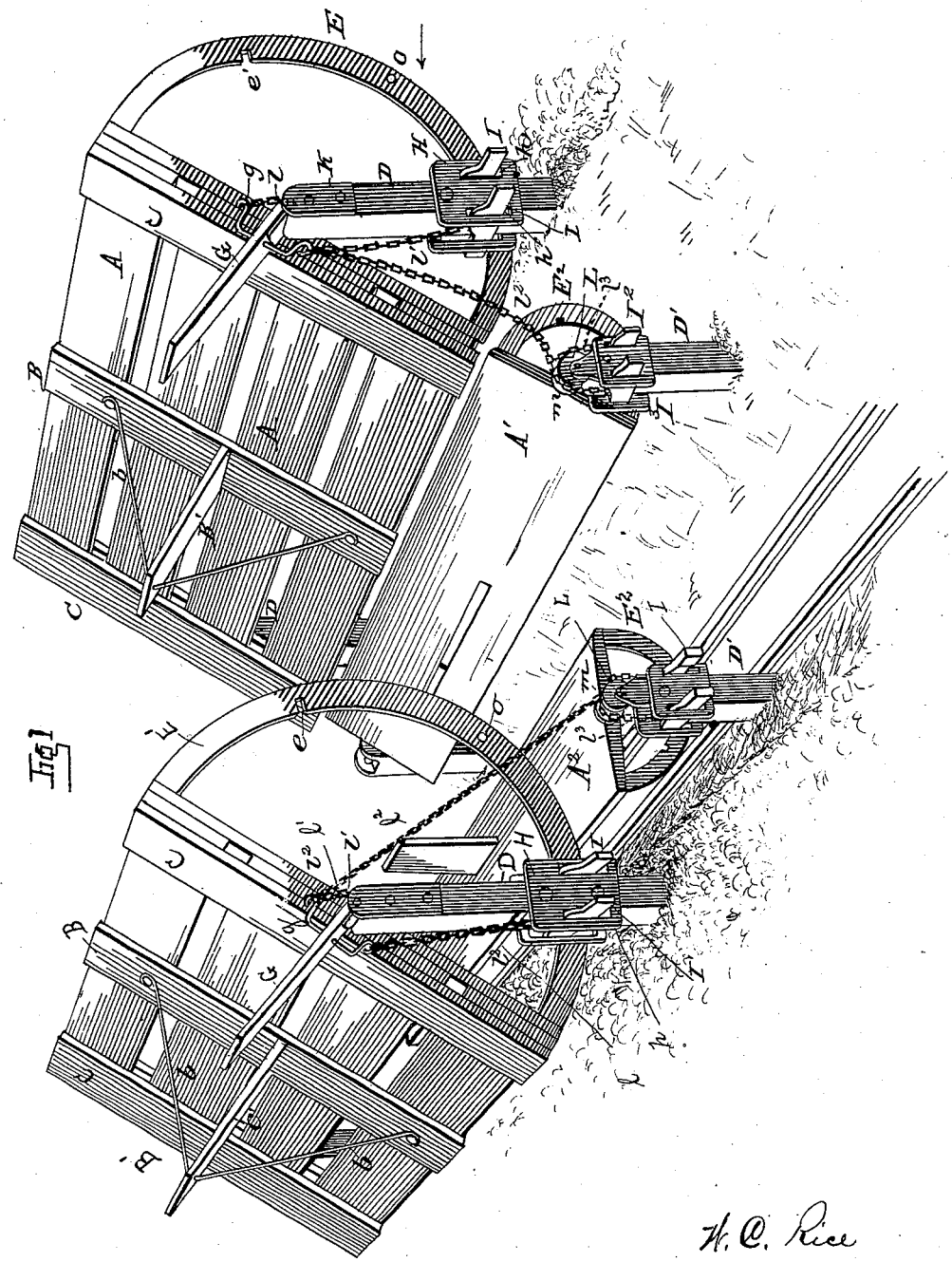

(No Model.) 3 Sheets—Sheet 1.

W. C. RICE.
DEVICE FOR CLEARING RAILROAD CUTS OF SNOW.

No. 284,900. Patented Sept. 11, 1883.

WITNESSES:

INVENTOR.

ATTORNEYS.

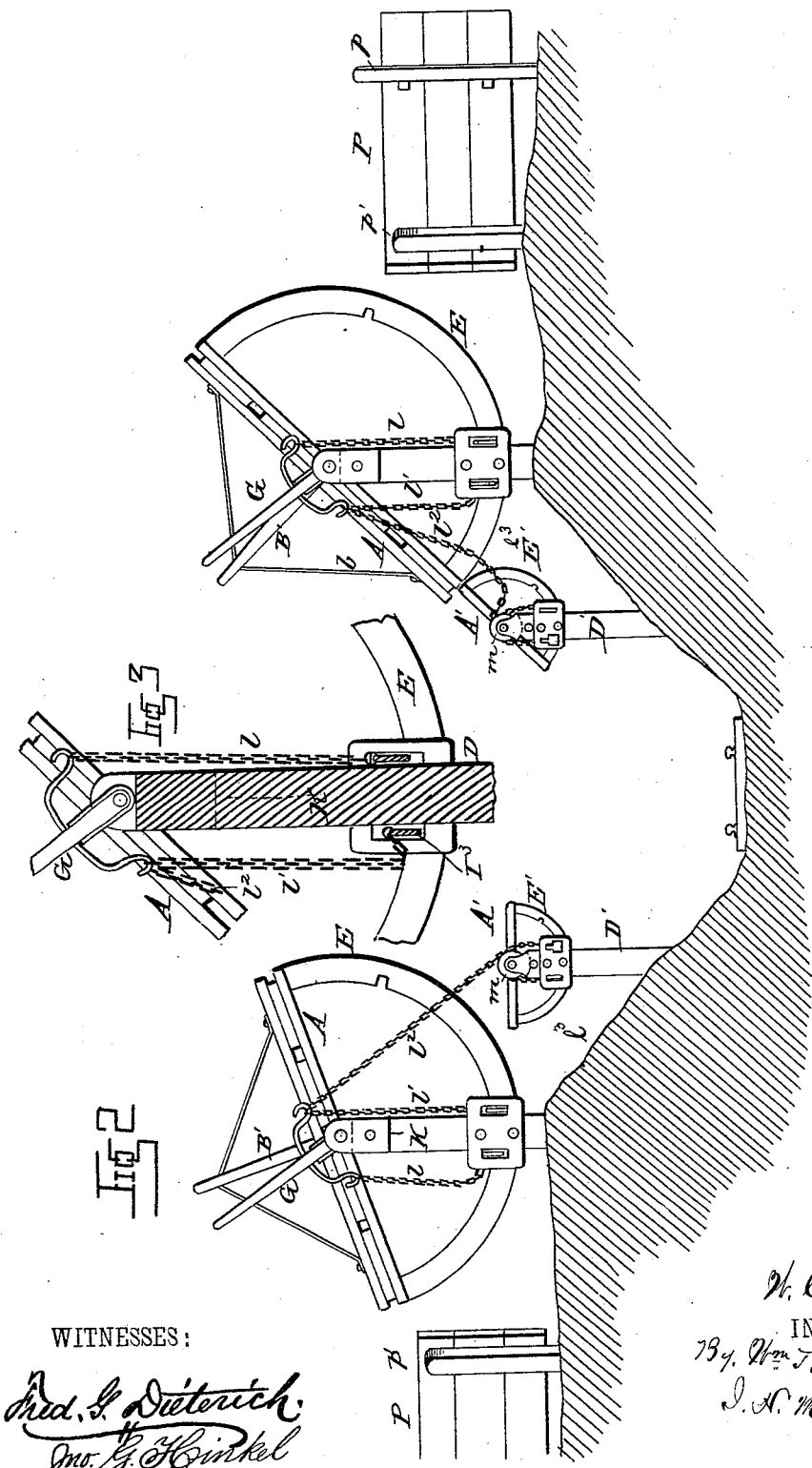

(No Model.) 3 Sheets—Sheet 3.
W. C. RICE.
DEVICE FOR CLEARING RAILROAD CUTS OF SNOW.
No. 284,900. Patented Sept. 11, 1883.
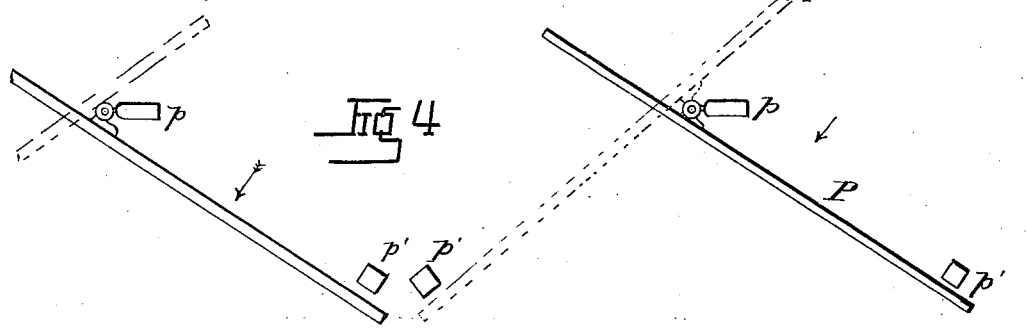
Fig. 4
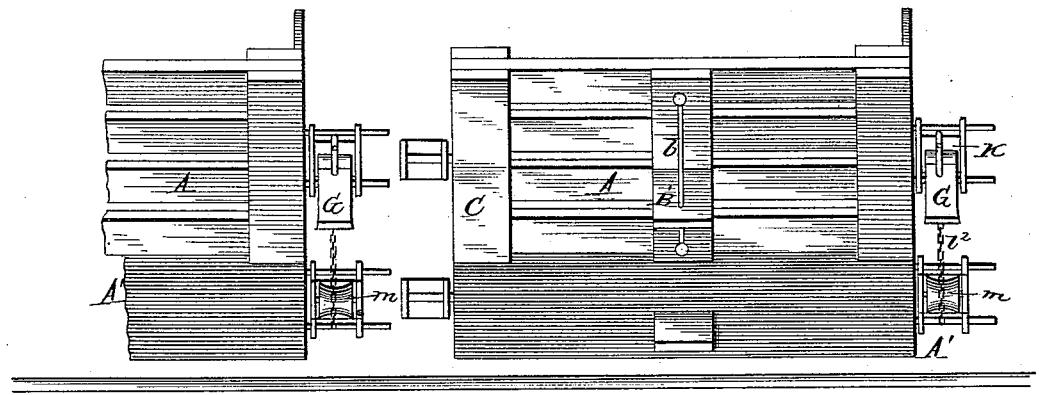
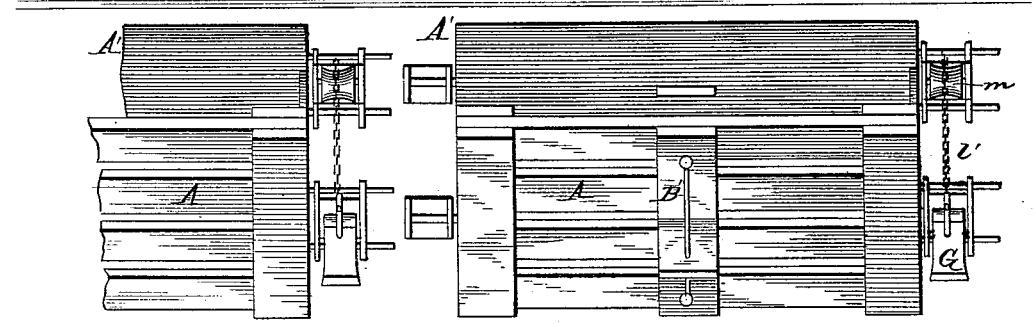
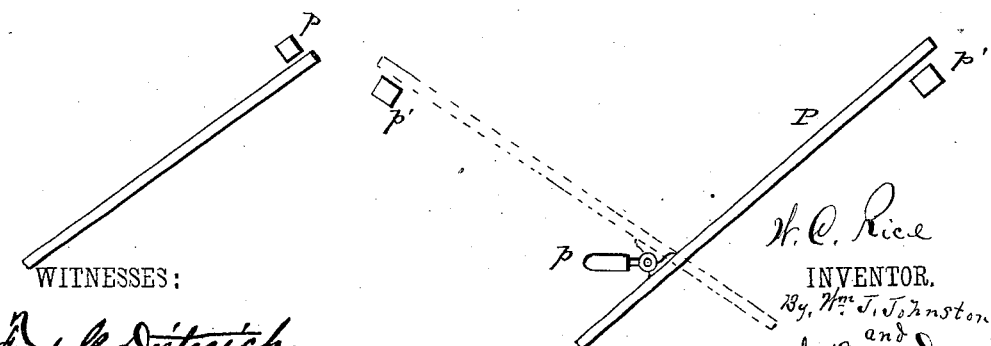
WITNESSES:
Fred. G. Dieterich
Jno. G. Hinkel
W. C. Rice
INVENTOR.
By Wm. J. Johnston
and J. N. MacDonald
ATTORNEYS

UNITED STATES PATENT OFFICE.

WILLIAM C. RICE, OF OAKLAND, IOWA.

DEVICE FOR CLEARING RAILROAD-CUTS OF SNOW.

SPECIFICATION forming part of Letters Patent No. 284,900, dated September 11, 1883.

Application filed April 25, 1883. (No model.)

*To all whom it may concern:*

Be it known that I, WM. C. RICE, a citizen of the United States, residing at Oakland, in the county of Franklin and State of Iowa, have invented certain new and useful Improvements in Devices for Clearing Railroad-Cuts of Snow, of which the following is a specification, reference being had therein to the accompanying drawings.

My invention relates to means for preventing the accumulation of snow in railroad-cuts; and it consists in an automatically-adjustable fence of peculiar construction, placed along the sides of the cut and operated on by the wind in such manner that each panel or section will adjust itself to the direction of the wind and concentrate the force of the current down the side of the cut and out beneath the panels on the opposite side, as will be hereinafter more fully described in the specification, and pointed out in the accompanying drawings, in which—

Figure 1 is a perspective view of a section or panel of the fence placed on the sides of a railroad-cut and embodying my invention. Fig. 2 is a cross-section of same. Fig. 3 is a side elevation, partly in section, of the end of a panel, showing the means of adjusting the panel to the direction of the wind and securing it in position. Fig. 4 is a plan view of my device.

Referring to the drawings, each fence panel or section consists of the pieces A, having the cleats C bolted or secured thereto at the ends, and a central cleat, B, provided with a wind-gage, B', secured to the cleat by the rods $b$. The panel is journaled in bearings in plate K, secured to the posts D. The journal for the panel also forms a journal for the adjusting-gage G, which turns on the top of the post D. Attached to this adjusting-gage is a hook-rod, $g$, to the ends of which are secured chains $l\ l'$ $l^2$, one of which, $l^2$, passes to the pulley L on a second or lower panel, A', placed lower down in the side of the cut, and one to the locking-bars I I', which play in slots $h$ of the plate H on the post D. These locking-bars I I' are also adapted to enter notches $e\ e'$ in the curved bar E, secured at its ends to the panel A. There may be one or more auxiliary panels in the sides of the cuts, as may be deemed necessary, regulated, of course, by the depth of the cut to be cleared. Placed at a suitable distance in rear of each panel is a wind-deflector, P, consisting of a rectangular frame suspended above the ground and hinged to a small post, $p$, in such manner that it will adjust itself to an angle with the line of the cut, its motion being limited by posts $p'$. The object of this deflector is to direct the current toward the cut and against the panel when the wind is blowing obliquely to the line of the cut, and thus cause it to pass beneath the panels and down the sides of the cut, as before described.

The operation is as follows: Suppose the wind to come in the direction indicated by the arrow, Fig. 1. At the same time it turns the gage G, and this draws up the bar I' and allows the bar I to drop into the notch $e$, which is so placed upon the curved bar E as to permit the panel to stand at an angle of forty-five degrees, so as to get the greatest amount of air-deflection without impeding the current. At the same time the panel A' in the side of the cut has also assumed a position at a suitable angle to the side of the cut, and is locked in the same way and by the same means as in the upper panel. The chain $l^2$, secured at one end to the hook-rod $g$, passes down and around a pulley, L, journaled in the post D', and is secured to the bar I². A short chain, $l^3$, is attached at one end to the chain $l^2$, the opposite end being secured to the bar I². Suppose the panels A A' to be in the position shown in Fig. 1. Now, if the wind blows from the opposite side of the cut, the panel A will be turned in the opposite direction. The chain $l^2$ lifts bar I³ out of its engaging-notch on the bar E², which permits panel A' to turn until bar I² engages with the other notch in bar E². If the wind again shifts to the first direction, the bar I² is first lifted by the chain $l^3$ and the panels resume the position shown in Fig. 1. If there be panels on the opposite side of the cut from A, as shown in Fig. 1, they will be tilted or adjusted to the direction of the wind. It is not absolutely necessary for the wind to blow straight across the cut in order to tilt the panels from one position to another, for, if it blow "quartering," it will act against the gages G B' and cause the panels to tilt, as before described. This gives an automatic movement to the several panels in the cut, as there may be two, three, or more panels like A', depending, of course, on the depth of the cut, and each successive panel from A' downward is operated by the chain $l^2$, which is lengthened out and hooks into a chain corresponding to $l^2$ on each pulley; hence the movement of the top panel guides or directs the movement of all the panels in the cut. Each of these panels assumes a position inclined to the face of the cut, and is locked, as before set forth. The panels on the opposite side of the cut are raised, as indicated, the upper one dropping until the notch $e$ is reached, and it then becomes locked, the panel $A^2$ being almost horizontal, the notches in the curved bar E' being so arranged that when the panels are turned in one position said panels will be inclined to the faces of the cut, and when in the other position they will be nearly horizontal.

Each one of the panels may be turned by hand to the required position in case of accident to any of the chains. A current of air coming from the direction of the arrow turns the panels A, as indicated in Fig. 3, passes underneath this panel, and is drawn down underneath panel A', which creates a strong draft downward until it passes under each panel and reaches the bottom of the cut. Here it is deflected upward and passes underneath the other panels $A^2$ and outward and opposite panel A, carrying with it the snow.

This device can also be used at switches and other points where it is necessary, and the switch kept clean, it simply being necessary to place one panel on each side of the switch.

Actual experiment with the device demonstrates the fact that snow can be readily and effectually carried out of a railroad cut and the banking up of snow in the cuts prevented, and all the time and expense of clearing a cut by snow-plows or section-hands avoided. Suppose the panels to be in any set position, and a snow-storm commences at night. It is not necessary for the section-hands to go to the cuts to set the panels, as they will adjust themselves. When there is a cut on but one side of the road-bed, the device need only to be placed in one side of the cut.

Having described my invention, what I claim, and desire to secure by Letters Patent, is—

1. A device for preventing accumulation of snow in railway cuts and switches, consisting in a fence or gate of one or more panels placed at the top of the cut, each gate or fence panel being provided with means for causing it to be automatically tilted or adjusted to the direction of the wind by the wind itself, and cause the wind to pass underneath said panel and down the side of the cut, substantially as and for the purpose set forth.

2. A series of adjustable gates or fence panels arranged at the top and in the sides of a railway-cut, the top panels being provided with means for automatically tilting or adjusting them to the direction of the wind, the panels or sections in the side of the cut being tilted or adjusted by the wind and by the top panels through the intervention of suitable mechanism connecting the said panels at top and side, substantially as and for the purpose set forth.

3. In a device for clearing snow from railway-cuts by the direct action of the wind, one or more pivoted panels, A, journaled in posts D, said panels being provided with a rigid wind-gage and a pivoted deflecting-gage, the wind-gage acting to turn the panel, the deflecting-gage acting, through the intervention of suitable mechanism, to release the panel from one locked position and allow it to turn and be locked in a new position, substantially as shown and described.

4. In a device for clearing snow from railway-cuts, the combination, with one or more movable panels, A, arranged as described, of wind-deflectors pivotally secured to posts placed in rear of the panels and adapted to turn by the action of the wind, substantially in the manner and for the purpose described.

5. In a device for clearing snow from railway-cuts, the wind-deflectors P, secured to posts placed at a suitable distance in rear of the movable panels A, the movement of said deflectors being limited by posts $p'$, said deflectors acting to turn the current from an oblique to a direct course to said panels A, substantially as set forth.

6. In a device for clearing snow from railway-cuts by the action of the wind, one or more panels or gates, A, pivotally mounted on posts D, said panels being provided with a wind-gage and deflecting-gage and a curved plate having recesses $e$ $e'$, adapted to receive locking-device levers I I', as and for the purpose set forth.

7. The combination, with gate or panel provided with a wind-gage and a locking-plate, E, of the deflecting-gage G and locking-levers I I', actuated by said deflecting-gage through the intervention of chains $l\,l'$, or other suitable means, as and for the purpose set forth.

8. The combination, with an upper gate or panel, A, actuated as described, of one or more intermediate lower panels, A', automatically operated by the movement of the upper panel, substantially as described.

9. The combination, in a snow-clearing device for railway-cuts, of one or more pivoted or turning panels or gates, at the top of the cut, a series of wind-deflectors in rear of each, a series of one or more panels in the sides of the cut, the upper panels being provided with wind-gages, and deflecting-gages, said deflecting-gages acting to lock or unlock the upper panels from any fixed position, and acting, through the intervention of a chain, drum, and suitable levers, to lock or unlock the lower panels, in the manner and for the purpose described.

In testimony whereof I affix my signature in presence of two witnesses.

WILLIAM C. RICE.

Witnesses:
EMMA M. GILLETT,
J. H. MACDONALD.